United States Patent
Wakita

(10) Patent No.: US 11,405,210 B2
(45) Date of Patent: Aug. 2, 2022

(54) AUTHENTICATION SYSTEM

(71) Applicant: Honda Motor Co., Ltd., Tokyo (JP)

(72) Inventor: Kazuyoshi Wakita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/194,909

(22) Filed: Mar. 8, 2021

(65) Prior Publication Data

US 2021/0288806 A1    Sep. 16, 2021

(30) Foreign Application Priority Data

Mar. 11, 2020   (JP) .............................. JP2020-041674

(51) Int. Cl.
*H04L 9/32*     (2006.01)
*H04L 9/08*     (2006.01)
*H04L 12/40*    (2006.01)

(52) U.S. Cl.
CPC .......... *H04L 9/3228* (2013.01); *H04L 9/0869* (2013.01); *H04L 9/3242* (2013.01); *H04L 12/40* (2013.01); *H04L 2012/40215* (2013.01); *H04L 2012/40273* (2013.01)

(58) Field of Classification Search
CPC ... H04L 9/3228; H04L 9/0869; H04L 9/3242; H04L 12/40; H04L 9/3273; H04L 9/0897
USPC ....... 713/164, 168, 169, 170, 171, 189, 190, 713/191; 726/2, 27, 28, 29; 380/259, 380/285
See application file for complete search history.

(56) References Cited

U.S. PATENT DOCUMENTS

2016/0173505 A1* 6/2016 Ichihara .............. H04W 12/121
                                                        713/170

FOREIGN PATENT DOCUMENTS

JP          2017017616 A      1/2017

* cited by examiner

*Primary Examiner* — Izunna Okeke
(74) *Attorney, Agent, or Firm* — Duft & Bornsen, PC

(57) ABSTRACT

An authentication system includes: ECUs constituting on-vehicle network and server device communicating with the ECU. The ECU stores ID and encryption key set individually to the ECU and used for authenticating data exchanged between the ECUs. The server device stores the ID and encryption key of the ECU. The ECU includes: first CPU configured to perform: generating authentication data; generating authentication code by encrypting the authentication data using the encryption key; and transmitting the ID, authentication data, and authentication code to the server device. The server device includes: second CPU configured to perform: acquiring the ID transmitted from the ECU; retrieving the encryption key of ECU corresponding to the ID acquired; acquiring the authentication data and authentication code transmitted from the ECU; and authenticating the ECU using the encryption key retrieved.

10 Claims, 4 Drawing Sheets

AUTHENTICATION SYSTEM

CROSS-REFERENCE TO RELATED APPLICATION

This application is based upon and claims the benefit of priority from Japanese Patent Application No. 2020-041674 filed on Mar. 11, 2020, the content of which is incorporated herein by reference.

BACKGROUND OF THE INVENTION

Field of the Invention

This invention relates to an authentication system for authenticating electronic control units mounted on vehicles and server device communicating with the electronic control units.

Description of the Related Art

Conventionally, there has been known an apparatus in which using a common key common to a plurality of ECUs mounted on a vehicle, a server device verifies validity of each ECU (for example, see JP 2017-017616 A). The apparatus described in JP 2017-017616 A is configured to allow the ECU authenticated by the server device to update an update firmware or the like.

However, as in the apparatus described in JP 2017-017616 A, when the validity of the ECU or the like is verified using a common key common to the plurality of ECUs, if the common key is leaked, it becomes difficult to specify the leakage source of the common key, and there is a risk of unauthenticated access to the server device using the leaked common key.

SUMMARY OF THE INVENTION

An aspect of the present invention is an authentication system, including: a plurality of an electronic control unit constituting on-vehicle network mounted on a vehicle; and a server device configured to communicate with the electronic control unit. The electronic control unit includes: a first storage unit configured to store identification information and an encryption key set individually to the electronic control unit and used for generating a code used for authenticating data exchanged between the plurality of the electronic control unit. The server device includes: a second storage unit configured to store the identification information and the encryption key of the electronic control unit. The electronic control unit includes: a first CPU and a first memory coupled to the first CPU. The first CPU is configured to perform: generating an authentication data used for authenticating the electronic control unit; generating an authentication code by encrypting the authentication data generated using the encryption key stored in the first storage unit; and transmitting the identification information stored in the first storage unit, the authentication data generated, and the authentication code generated to the server device. The server device includes: a second CPU and a second memory coupled to the second CPU. The second CPU is configured to perform: acquiring the identification information transmitted from the electronic control unit; retrieving the encryption key of the electronic control unit corresponding to the identification information acquired; acquiring the authentication data and the authentication code transmitted from the electronic control unit; and authenticating the electronic control unit using the encryption key retrieved.

Another aspect of the present invention is an authentication system, including: a plurality of an electronic control unit constituting on-vehicle network mounted on a vehicle; and a server device configured to communicate with the electronic control unit. The electronic control unit includes: a first storage unit configured to store identification information and an encryption key set individually to the electronic control unit and used for generating a code used for authenticating data exchanged between the plurality of the electronic control unit. The server device includes: a second storage unit configured to store the identification information and the encryption key of the electronic control unit. The electronic control unit includes: a first CPU and a first memory coupled to the first CPU. The first CPU is configured to function as: a data generation section configured to generate an authentication data used for authenticating the electronic control unit; a code generation section configured to generate an authentication code by encrypting the authentication data generated by the data generation section using the encryption key stored in the first storage unit; and an output section configured to transmit the identification information stored in the first storage unit, the authentication data generated by the data generation section, and the authentication code generated by the code generation section to the server device. The server device includes: a second CPU and a second memory coupled to the second CPU. The second CPU is configured to function as: a retrieval section configured to acquire the identification information transmitted from the electronic control unit to retrieve the encryption key of the electronic control unit corresponding to the identification information acquired; and an authentication section configured to acquire the authentication data and the authentication code transmitted from the electronic control unit to authenticate the electronic control unit using the encryption key retrieved by the retrieval section.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
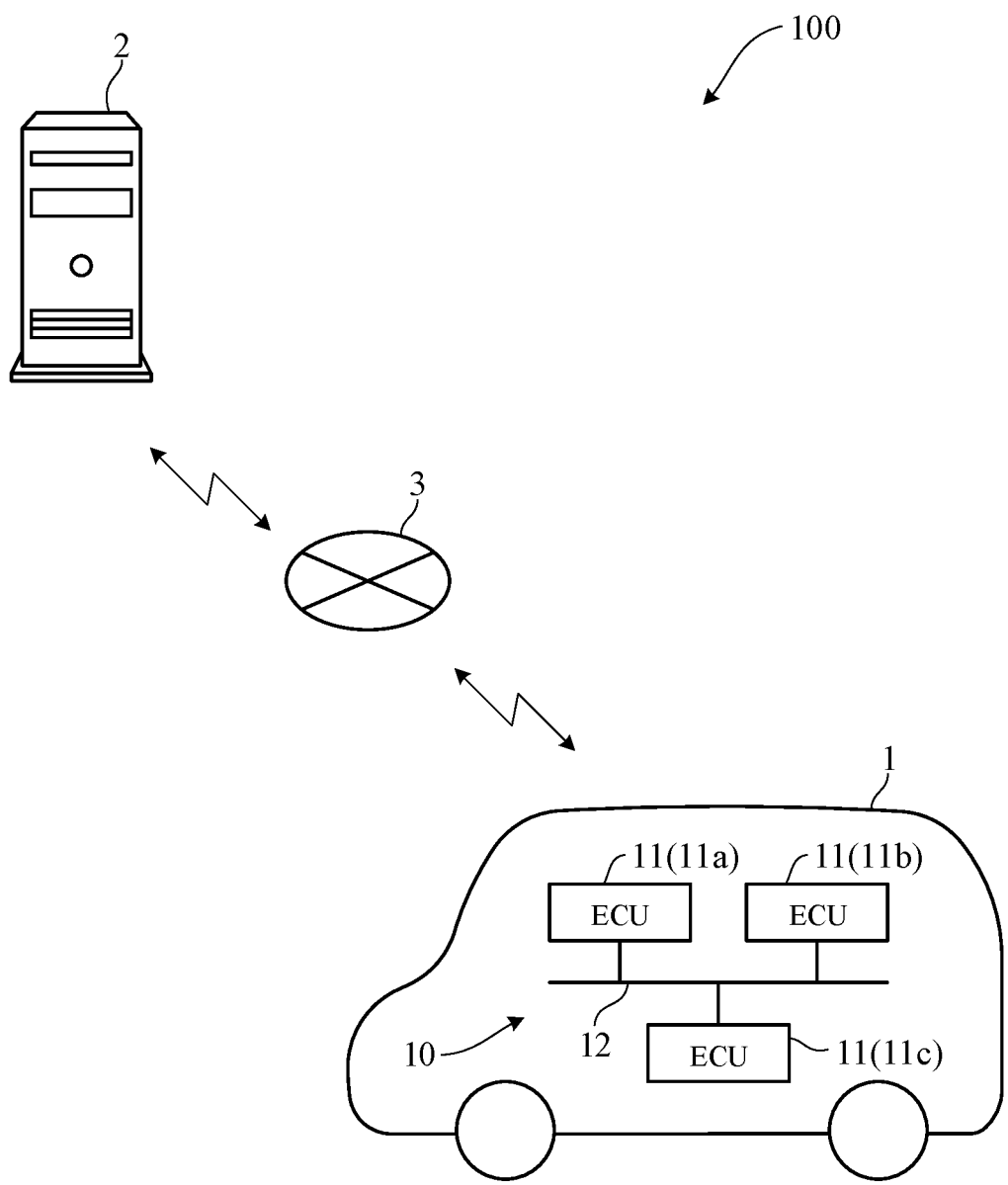
FIG. 1 is a diagram schematically showing an example of a configuration of an authentication system according to an embodiment of the present invention.

An embodiment of the present invention will be described below with reference to FIGS. 1 to 4. FIG. 1 is a diagram schematically showing an example of a configuration of an authentication system 100 according to an embodiment of the present invention. As shown in FIG. 1, the authentication system 100 includes a plurality of electronic control units (ECU) 11 mounted on a vehicle 1 and controlling operation of the vehicle 1 and the like, and a server device 2 capable of communicating with each of the electronic control units 11.

The plurality of electronic control units 11 are constituted of a plurality of ECUs differing in function, such as an engine control ECU 11a, a transmission control ECU 11b, and a steering control ECU 11c. The plurality of electronic control units 11 are communicatively connected to each other via a serial communication line 12 such as a CAN (Controller Area Network) communication line, and constitute an on-vehicle network 10. The server device 2 is communicatively connected to the on-vehicle network 10 via a network 3 including a public wireless communication network represented by an internet network, a cellular phone network, or the like.

A vehicle maker distributes an update program of the electronic control unit 11 through dealers or the like, as necessary for updating, improving quality or the like of a control program of the electronic control unit 11 of the vehicle 1. The dealer or the like checks whether or not there is an update program of the electronic control unit 11 corresponding to the vehicle 1 of a customer who comes to the store, and if there is the update program, the dealer connects the electronic control unit 11 to the server device 2 of the vehicle maker to update the control program of the electronic control unit 11. For example, the control program of the electronic control unit 11 is updated through an update device or the like.

The server device 2 permits only the electronic control unit 11, authenticated by the server device 2 of the vehicle maker, to update the control program in order to prevent unauthenticated acquisition of data due to masquerading and the like by unauthenticated hardware, software and the like of a malicious third party and the like. When a common key common to the plurality of electronic control units 11 is used to authenticate the electronic control units 11, if the common key is leaked from any of the plurality of electronic control units, it may become difficult to specify the leakage source. As a result, there is a possibility that an update program or the like is illegally acquired by using the leaked common key. Thus, the authentication system 100 according to the embodiment of the present invention is configured as follows so that the electronic control unit can be authenticated without lowering security.

Figure 2:
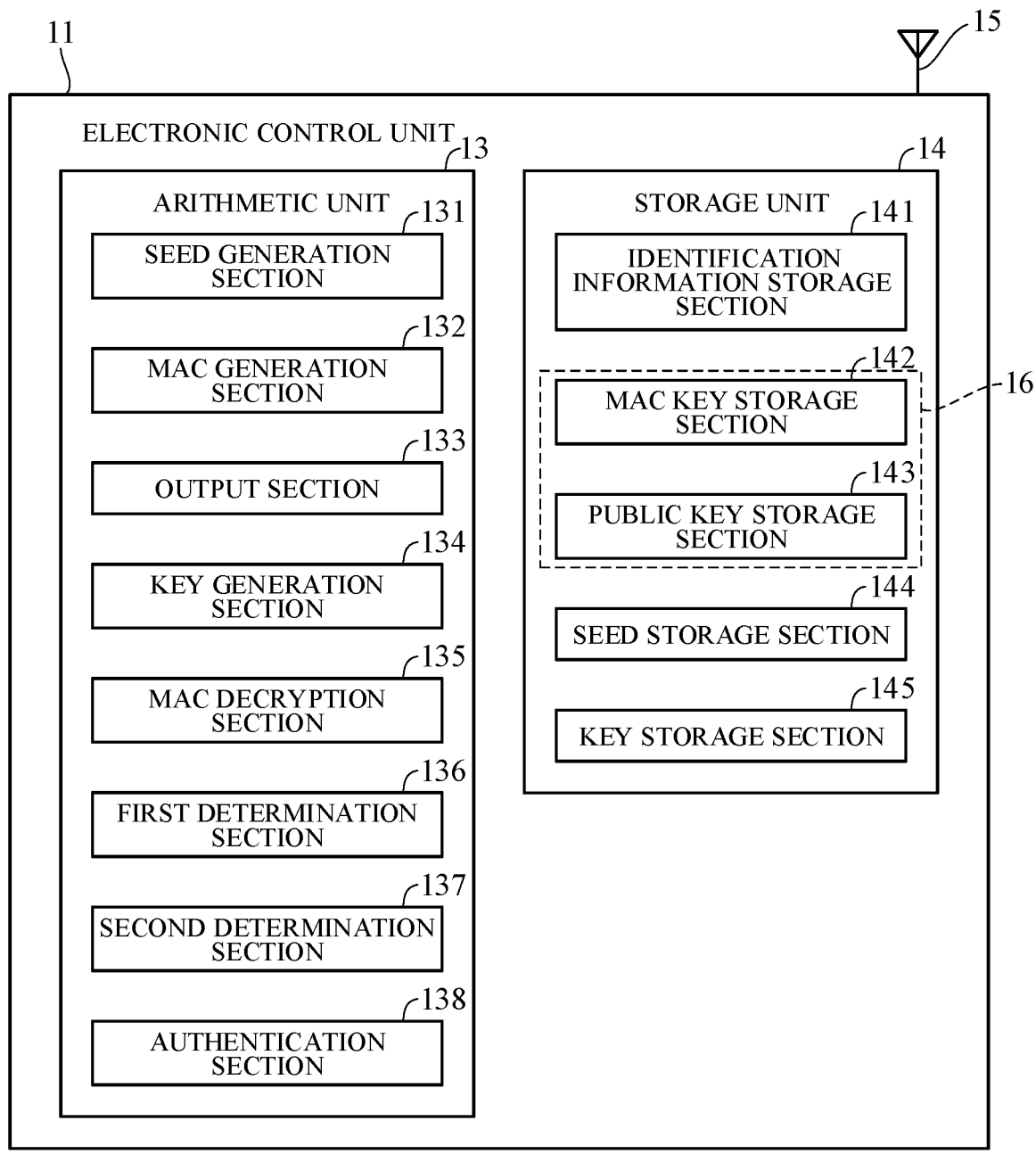
FIG. 2 is a block diagram schematically showing a configuration of a main part of an electronic control unit in FIG. 1.

FIG. 2 is a block diagram schematically showing a configuration of a main part of the electronic control unit 11 of FIG. 1. The electronic control unit 11 is configured to include a computer having an arithmetic unit 13 such as a CPU, a storage unit 14 such as a ROM, a RAM, or a hard disk, and other peripheral circuits, and is connectable to the network 3 via a communication unit 15.

The arithmetic unit 13 has, as a functional configuration, a seed generation section 131, a MAC generation section 132, an output section 133, a KEY generation section 134, a MAC decryption section 135, a first determination section 136, a second determination section 137, and an authentication section 138. The seed generation section 131 constitutes a data generation section, and the MAC generation section 132 constitutes a code generation section.

The storage unit 14 has, as a functional configuration, an identification information storage section 141, a MAC key storage section 142, a public key storage section 143, a seed storage section 144, and a KEY storage section 145. The MAC key storage section 142 and the public key storage section 143 are stored in an HSM (Hardware Security Module) 16 of the electronic control unit 11.

When the seed generation section 131 receives an identification information request signal, which is transmitted from the server device 2 and will be described later, via the communication unit 15, the seed generation section 131 generates a seed (seed value, authentication data) including a random number by a known method. The seed is authentication data used for authentication of each of the electronic control units 11 between each of the electronic control units 11 and the server device 2. The seed generated by the seed generation section 131 is temporarily stored together with a preset effective period (for example, 10 minutes) in the seed storage section 144.

The MAC generation section 132 encrypts the seed generated by the seed generation section 131 using a MAC key (encryption key) stored in the MAC key storage section 142, and generates a message authentication code (hereinafter also referred to simply as "MAC (Message Authentication Code)") using the seed as source data. The MAC generated by the MAC generation section 132 constitutes an authentication code, and the MAC generation section 132 generates a first MAC (first authentication code) to be transmitted to the server device 2.

The MAC generation section 132 generates a MAC obtained by encrypting data exchanged with the MAC key when the electronic control units 11 exchange the data (message) with each other. The MAC is a code used for authentication of the data exchanged between the electronic control units 11. That is, the MAC generation section 132 generates the first MAC used for authentication of the seed exchanged between the electronic control unit 11 and the server device 2, and the MAC used for authentication of the data exchanged between the electronic control units 11.

The first MAC and the MAC generated by the MAC generation section 132 are generated using a known MAC algorithm. The known MAC algorithm includes a method using a hash function (HMAC) and a method using a block encryption algorithm (OMAC/CMAC, CBC-MAC, PMAC), and the MAC generation section 132 uses these methods to encrypt and decrypt seeds and data using the MAC key.

When the output section 133 receives an identification information request (identification information request signal) transmitted from the server device 2 via the communication unit 15, the output section 133 transmits identification information (identification information signal) of the vehicle 1 stored in the identification information storage section 141 to the server device 2 via the communication unit 15. When the MAC generation section 132 generates the first MAC, the output section 133 transmits the seed generated by the seed generation section 131 and the first MAC generated by the MAC generation section 132 to the server device 2 via the communication unit 15.

The KEY generation section 134 encrypts the seed generated by the seed generation section 131 using a public key stored in the public key storage section 143 to generate a first key The first key generated by the KEY generation section 134 is generated using a known common key encryption method (AES). The first key generated by the KEY generation section 134 is stored together with a preset effective period (for example, 10 minutes) in the KEY storage section 145.

The MAC decryption section 135 uses the MAC key stored in the MAC key storage section 142 to decrypt a later-described second MAC transmitted from the server device 2, and returns the second MAC to the original data before encryption. That is, the MAC decryption section 135 decrypts the second MAC and returns the second MAC to a later-described second key which is the original data. The MAC decryption section 135 decrypts the second MAC by using the same encryption method of the MAC algorithm as in the server device 2. Thus, in the electronic control unit 11 and the server device 2, a MAC algorithm method used for encryption and decryption is set in advance.

The first determination section 136 compares the second key transmitted from the server device 2 with the second key decrypted by the MAC decryption section 135 and determines whether or not these second keys match. The second determination section 137 compares the first key encrypted with the public key by the KEY generation section 134 with the second key transmitted from the server device 2 and determines whether or not the first key and the second key match. That is, the first determination section 136 and the second determination section 137 verify validity of the server device 2.

The authentication section 138 authenticates the server device 2 when the first determination section 136 determines that the transmitted second key matches the decrypted second key and when the second determination section 137 determines that the first key matches the second key. When the authentication section 138 authenticates the server device, the authentication section 138 releases security to the server device 2 and shifts to a state in which data communication with the server device 2 is possible. For example, the authentication section 138 shifts a state in which the control program of the electronic control unit 11 can be updated. On the other hand, the authentication section 138 does not authenticate the server device 2 when the first determination section 136 determines that the transmitted second key does not match the decrypted second key or when the second determination section 137 determines that the first key does not match the second key. In this case, the authentication section 138 controls the communication unit 15 to cut off the connection with the server device 2.

The identification information storage section 141 stores the identification information of each of the vehicles 1 allocated by a vehicle maker. The identification information of the vehicle 1 includes, for example, a vehicle ID assigned to each of the vehicles 1 by the vehicle maker, an ECUID assigned to each of the electronic control units mounted on the vehicle 1, and the like.

The MAC key storage section 142 stores the MAC generated by the MAC generation section 132 and the MAC key used for generating the first MAC. The MAC key is a key which is set individually for each of the electronic control units 11 and is different for each of the electronic control units 11. Thus, for example, even when the MAC key is leaked, it becomes easy to confirm the electronic control unit 11 in which the leaked MAC key is set among the plurality of electronic control units 11, and it becomes easy to specify the leakage source and a leakage destination. As a result, it is possible to prevent masquerading to the electronic control unit 11 that has leaked the MAC key, unauthenticated acquisition of data or the like, and the like.

The public key storage section 143 stores a public key that can be commonly used by each of the electronic control units 11. The public key is a key which is common to each of the electronic control units 11 and corresponds to a later-described secret key registered in the server device 2. A public key cryptographic scheme (AES) is used for encryption using the public key, and in the public key cryptographic scheme, mutually different public key and secret key pairs are generated and pre-shared between various data transmitting side and receiving side.

The seed storage section 144 temporarily stores the seed generated by the seed generation section 131. The seed storage section 144 erases information of the seed when a preset effective period (for example, 10 minutes) has elapsed. The KEY storage section 145 temporarily stores the first key generated by the KEY generation section 134. The KEY storage section 145 erases information of the first key when a preset effective period (for example, 10 minutes) has elapsed.

The server device 2 is configured to include a computer having an arithmetic unit 20 such as a CPU, a storage unit 21 such as a ROM, a RAM, or a hard disk, and other peripheral circuits, and is connectable to the network 3 via a communication unit 22. The arithmetic unit 20 has, a functional configuration, a retrieval section 201, a MAC decryption section 202, a determination section 203, an authentication section 204, a KEY generation section 205, a MAC generation section 206, and an output section 207. The storage unit 21 has, as a functional configuration, a vehicle database 211, a secret key storage section 212, a seed storage section 213, and a KEY storage section 214.

When the retrieval section 201 receives the identification information (identification information signal) transmitted from the electronic control unit 11 via the communication unit 22, based on the received identification information, the retrieval section 201 retrieves, from vehicle information stored in the vehicle database 211, a unique MAC key set in the electronic control unit 11 which has transmitted the identification information. For example, the retrieval section 201 specifies the corresponding vehicle 1 among the plurality of vehicles based on the vehicle ID transmitted from the electronic control unit 11, and specifies the corresponding electronic control unit 11 among the plurality of electronic control units based on the ECUID. When the retrieval section 201 specifies the electronic control unit 11, the retrieval section 201 extracts information of the MAC key from identification information of the electronic control unit 11.

The MAC decryption section 202 uses the MAC key retrieved by the retrieval section 201 to decrypt the first MAC transmitted from the electronic control unit 11, and returns the first MAC to the original data before encryption. That is, the MAC decryption section 202 decrypts the first MAC and returns the first MAC to the seed which is the original data. The MAC decryption section 202 decrypts the first MAC by using the same encryption method of the MAC algorithm as in the MAC generation section 132 of the electronic control unit 11.

The determination section 203 compares the seed transmitted from the electronic control unit 11 with the seed decrypted by the MAC decryption section 202, and determines whether or not the transmitted seed matches the decrypted seed. That is, validity of the electronic control unit 11 is verified.

The authentication section 204 authenticates the electronic control unit 11 when the determination section 203 determines that the transmitted seed matches the decrypted seed. On the other hand, the authentication section 204 does not authenticate the electronic control unit 11 when the determination section 203 determines that the transmitted seed does not match the decrypted seed. In this case, the authentication section 204 controls the communication unit 22 to cut off the connection with the electronic control unit 11.

The KEY generation section 205 encrypts the seed transmitted from the electronic control unit 11 by using a secret key stored in the secret key storage section 212 to generate a second key The second key generated by the KEY generation section 205 is generated using a known common encryption method (AES). The second key generated by the KEY generation section 205 is stored together with a preset effective period (for example, 10 minutes) in the KEY storage section 214.

The MAC generation section 206 encrypts the second key generated by the KEY generation section 205 by using the MAC key retrieved by the retrieval section 201, and generates the second MAC (second authentication code) using the second key as source data. The MAC generation section 206 generates the second MAC by using the same encryption method of the MAC algorithm as in the electronic control unit 11.

When the output section 207 receives an authentication request via the communication unit 22, the output section 207 transmits the identification information request signal requesting the identification information of the vehicle 1 to the electronic control unit 11 via the communication unit 22. When the MAC generation section 206 generates the second MAC, the output section 207 transmits the second key that is the source data of the second MAC and the second MAC generated by the MAC generation section 206 to the electronic control unit 11 via the communication unit 22.

The vehicle database 211 stores information of a plurality of the vehicles 1 managed by the server device 2. The information of the vehicle 1 includes, for example, the vehicle ID assigned to each of the vehicles 1 by a vehicle maker, the ECUID assigned to each of the electronic control units 11 mounted on the vehicle 1, and the like, and the information of the electronic control unit 11 to which the ECUID is assigned includes the information of the MAC key set individually for each of the electronic control units 11.

The secret key storage section 212 stores the secret key corresponding to the public key shared by each of the electronic control units 11. The seed storage section 213 temporarily stores the seed transmitted from the electronic control unit 11. The seed storage section 213 erases the information of the seed when a preset effective period (for example, 10 minutes) has elapsed. The KEY storage section 214 temporarily stores the second key generated by the KEY generation section 205. The KEY storage section 214 erases information of the second key when a preset effective period (for example, 10 minutes) has elapsed.

Figure 4:
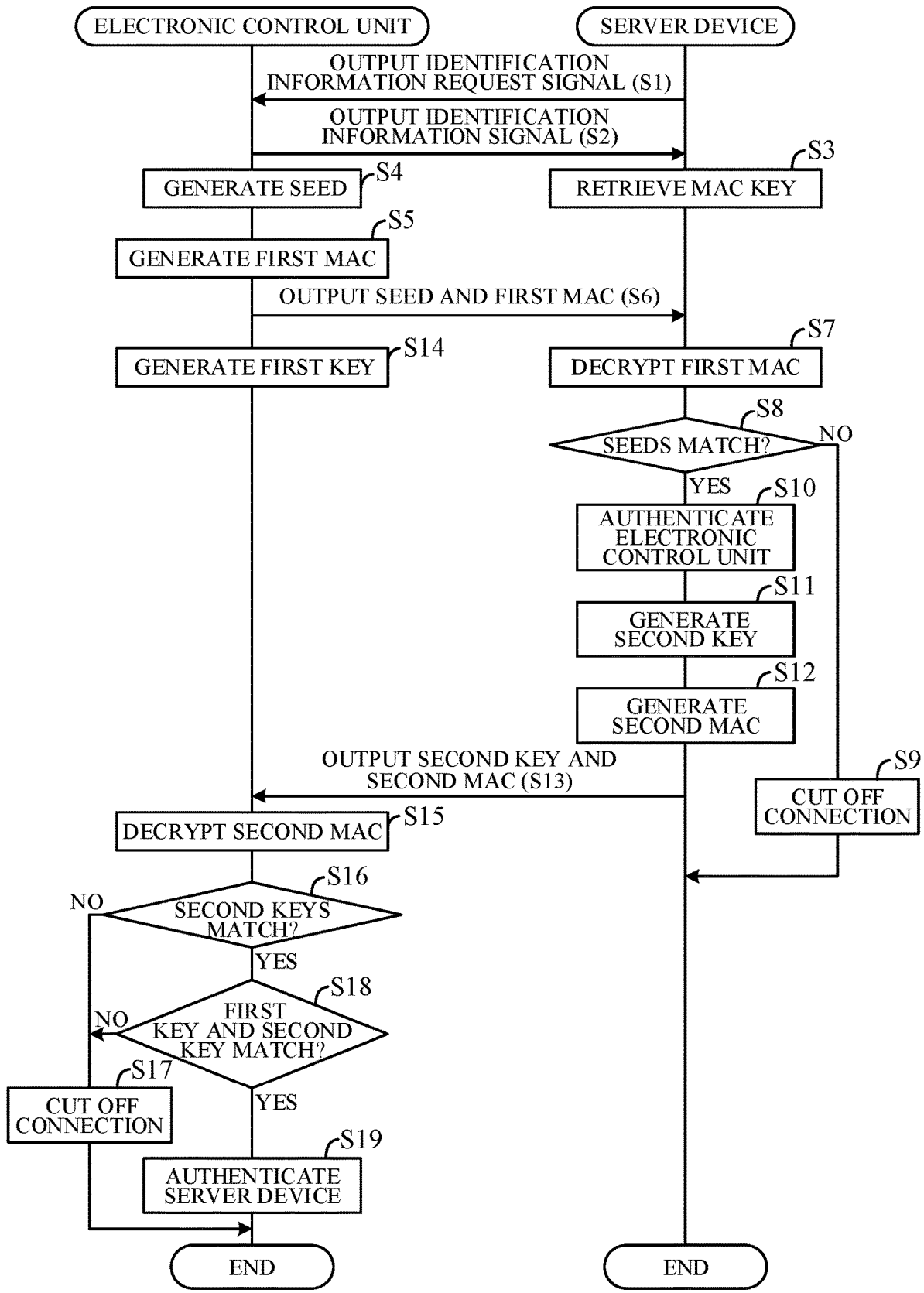
FIG. 4 is a sequence diagram showing an example of authentication processing in the electronic control unit and the server device executed by the authentication system in FIG. 1.

FIG. 4 is a sequence diagram showing an example of authentication processing in the electronic control unit 11 and the server device 2 executed by the authentication system 100 of FIG. 1, and shows an example of authentication processing executed by the arithmetic unit 13 of the electronic control unit 11 and authentication processing executed by the arithmetic unit 20 of the server device 2 in accordance with a prestored program. The processing shown in the sequence diagram of FIG. 4 starts, for example, when the electronic control unit 11 is connected to the server device 2 via the network 3 and when an authentication request signal from a user is input to the server device 2 via the electronic control unit 11 or an update device or the like interposed between the electronic control unit 11 and the server device 2.

When the authentication request signal from the user is input to the server device 2, in S1 (S: processing step), the identification information request signal requesting the identification information of the vehicle 1 is output toward the electronic control unit 11 by the output section 207 of the server device 2. When the identification information request signal is input to the electronic control unit 11, in S2, the identification information signal of the electronic control unit 11 is output toward the server device 2 by the output section 133 of the electronic control unit 11. When the identification information signal of the electronic control unit 11 is input to the server device 2, in S3, the retrieval section 201 of the server device 2 retrieves the MAC key of the electronic control unit 11 based on the input identification information signal.

When the identification information request signal is input to the electronic control unit 11, in S4, the seed generation section 131 of the electronic control unit 11 generates the seed including the random number. S4 may be executed before S3 is executed. Next, the MAC generation section 132 of the electronic control unit 11 encrypts the seed generated by the seed generation section 131 with the MAC key stored in the MAC key storage section 142 to generate the first MAC (S5). Next, the output section 133 of the electronic control unit 11 outputs the seed generated by the seed generation section 131 and the first MAC generated by the MAC generation section 132 toward the server device 2 (S6).

Next, when the seed and the first MAC are input to the server device 2, in S7, the MAC decryption section 202 of the server device 2 decrypts the transmitted first MAC. Next, in S8, the determination section 203 of the server device 2 compares the seed transmitted from the electronic control unit 11 with the seed decrypted by the MAC decryption section 202, and determines whether or not the transmitted seed matches the decrypted seed. If the result is negative in S8, in S9, connection with the electronic control unit 11 is cut off by the processing in the authentication section 204. On the other hand, if the result is positive in S8, in S10, the electronic control unit 11 is authenticated by the processing in the authentication section 204.

Next, in S11, the KEY generation section 205 of the server device 2 encrypts the seed transmitted from the electronic control unit 11 by using the secret key stored in the secret key storage section 212 to generate the second key Next, in S12, the MAC generation section 206 encrypts the second key generated by the KEY generation section 205 by using the MAC key retrieved by the retrieval section 201, and generates the second MAC (second authentication code) using the second key as source data.

Next, in S13, the output section 207 of the server device 2 transmits the second key and the second MAC to the electronic control unit 11. Next, in S14, the KEY generation section 134 of the electronic control unit 11 encrypts the seed generated by the seed generation section 131 by using the public key stored in the public key storage section 143 to generate the first key S14 may be executed before S7 to S13 are executed or during S7 to S13.

Next, in S15, the MAC decryption section 135 of the electronic control unit 11 uses the MAC key stored in the MAC key storage section 142 to decrypt the second MAC transmitted from the server device 2. Next, in S16, the first determination section 136 determines whether or not the second key transmitted from the server device 2 matches the second key decrypted by the MAC decryption section 135. If the result is negative in S16, in S17, connection with the server device 2 is cut off by the processing in the authentication section 138. On the other hand, if the result is positive in S16, in S18, the second determination section 137 determines whether or not the first key matches the second key. If the result is negative in S18, in S17, connection with the server device 2 is cut off by the processing in the authentication section 138. On the other hand, if the result is positive in S18, in S19, the server device 2 is authenticated by the processing in the authentication section 138, and the process ends.

A main operation of the authentication system 100 according the present embodiment will be described. When the electronic control unit 11 of the vehicle 1 makes an authentication request to the server device 2 of a vehicle maker, the electronic control unit 11 transmits the identification information of the vehicle 1 via the network 3 (S2), and the server device 2 retrieves the MAC key of the electronic control unit 11 based on the transmitted identification information (S3). The MAC key of the electronic control unit 11 is a key registered in the server device 2 of the vehicle maker together with information about the vehicle 1 when the vehicle maker registers the vehicle 1 manufactured.

The electronic control unit 11 encrypts the seed by using the MAC key to generate the first MAC (S5), and the server device 2 decrypts the first MAC by using the MAC key (S7). That is, the server device 2 verifies the validity of the electronic control unit 11 by using the MAC key, authenticates the electronic control unit 11, and cuts off the connection with the electronic control unit 11 as necessary (S8 to S10).

Similarly, the server device 2 generates the second MAC by using the MAC key (S12), and the electronic control unit 11 decrypts the second MAC by using the MAC key (S15). That is, the electronic control unit 11 verifies the validity of the server device 2 by using the MAC key, authenticates the server device 2, and cuts off the connection with the server device 2 as necessary (S16 to S19).

Figure 3:
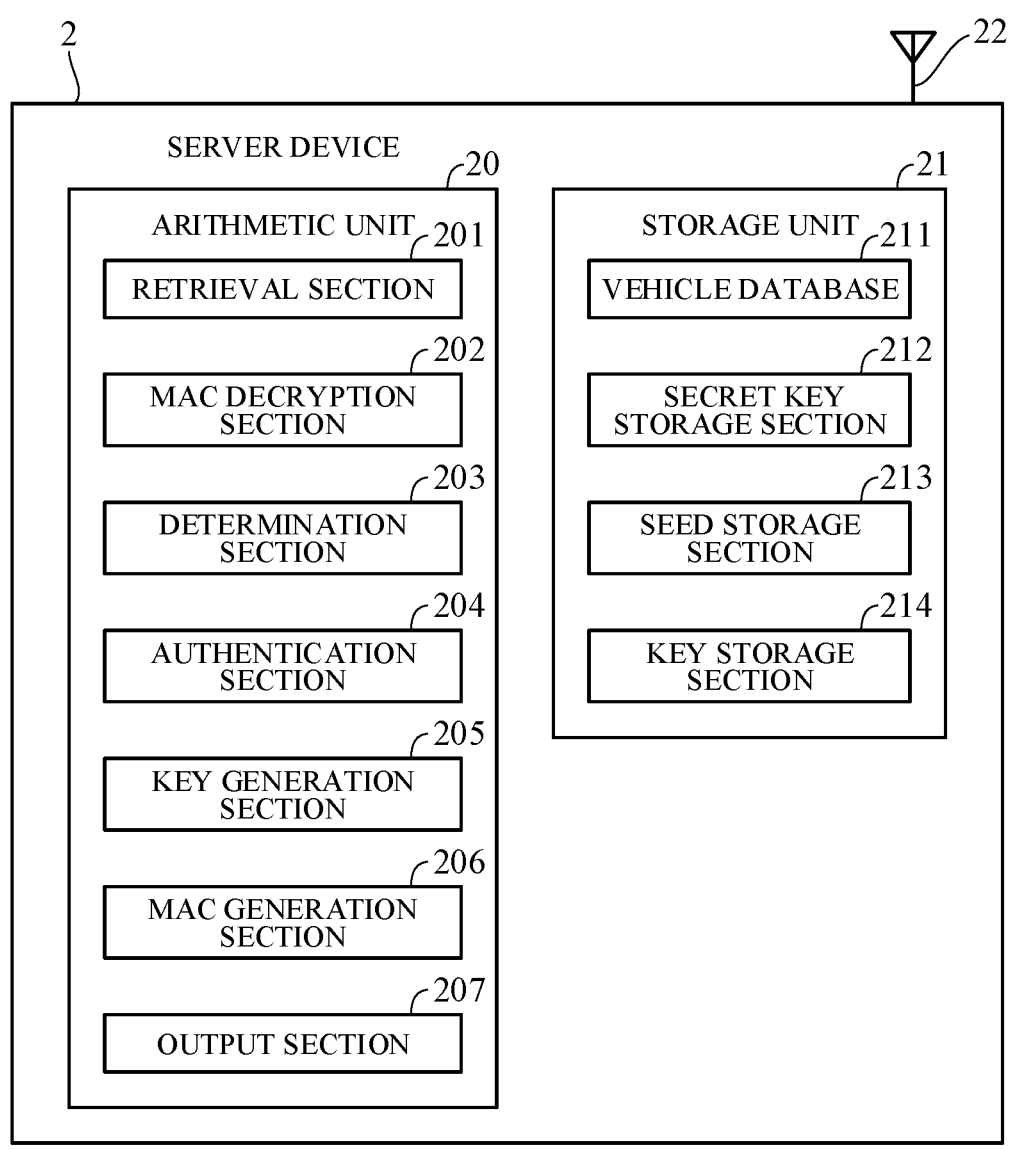
FIG. 3 is a block diagram schematically showing a configuration of a main part of an server device in FIG. 1.

The present embodiment can achieve advantages and effects such as the following:

(1) the authentication system 100 includes the plurality of electronic control units 11 constituting the on-vehicle network 10 mounted on the vehicle 1, and the server device 2 communicating with each of the electronic control units 11 (FIG. 1). Each of the electronic control units 11 has the MAC key storage section 142 that stores the MAC key set individually for the electronic control unit 11 in order to generate the MAC used for authentication of data when the electronic control units 11 exchange the data with each other (FIG. 2). The server device 2 has the vehicle database 211 that stores the identification information of each of the electronic control units 11 and the information of the MAC key (FIG. 3). Each of the electronic control units 11 further has the seed generation section 131 that generates the seed used for authentication of the electronic control unit 11, the MAC generation section 132 that encrypts the seed generated by the seed generation section 131 with the MAC key to generate the first MAC, and the output section 133 that transmits the identification information, the authentication data, and the first MAC to the server device 2 (FIG. 2). The server device 2 further has the retrieval section 201 that, when acquiring the identification information transmitted by the output section 133, retrieves the MAC key of the corresponding electronic control unit 11 based on the acquired identification information, and the authentication section 204 that, when acquiring the seed and the first MAC transmitted by the output section 133, authenticates the electronic control unit 11 by using the MAC key retrieved by the retrieval section 201 (FIG. 3).

With this configuration, since the server device 2 authenticates the electronic control unit 11 by using the MAC key used for authentication between the electronic control units 11 and set individually for the electronic control unit 11, security at the time of the authentication can be improved.

For example, even when the key for authentication (MAC key) is leaked, it becomes easy to specify the leakage source and the leakage destination, and unauthenticated access using the leaked key can be prevented. Since the MAC key is a key that the electronic control unit 11 and the server device 2 have in advance, it is not necessary to newly provide a key for authentication, and management of the key is facilitated.

(2) The server device 2 further has the MAC generation section 206 that encrypts the seed by using the acquired seed and the retrieved MAC key to generate the second MAC and the output section 207 that transmits the seed and the second MAC to the electronic control unit 11 (FIG. 3). The electronic control unit 11 further has the authentication section 138 that authenticates the server device 2 by using the MAC key when receiving the seed and the second MAC transmitted by the server device 2 (FIG. 2). Thus, the authentication of the server device 2 by the electronic control unit 11 using the MAC key becomes possible. Since it is not necessary to newly provide a key for authentication even in the authentication of the electronic control unit 11, management of the key is facilitated.

(3) When the server device 2 acquires the seed and the first MAC, the server device 2 authenticates the electronic control unit 11 by decrypting the first MAC or encrypting the seed with the MAC key, and when the electronic control unit 11 acquires the seed and the second MAC, the electronic control unit 11 authenticates the server device 2 by decrypting the second MAC or encrypting the seed with the MAC key (FIG. 4). Thus, since the server device 2 and the electronic control unit 11 are authenticated by encryption or decryption using the MAC key, the security at the time of authentication can be improved.

(4) For each of the electronic control units 11, the MAC key that is different for each of the electronic control units 11 is set. Thus, even when the MAC key is leaked, it becomes easy to specify the leakage source and the leakage destination, and unauthenticated access using the leaked key can be prevented.

In the above embodiment, although the server device 2 decrypts the first MAC with the MAC key to verify the validity of the electronic control unit 11, the seed may be encrypted with the MAC key to verify the validity of the electronic control unit 11. Similarly, although the electronic control unit 11 verifies decrypts the second MAC with the MAC key to verify the validity of the server device 2, the second key may be encrypted with the MAC key to verify the validity of the server device 2.

In the above embodiment, the second key obtained by encrypting the seed with the secret key is encrypted with the MAC key to generate the second MAC, and the electronic control unit 11 decrypts the second MAC with the MAC key to verify the validity of the server device 2. However, the seed may be encrypted with the MAC key to generate the second MAC, and the electronic control unit 11 may decrypt the second MAC with the MAC key to verify the validity of the server device 2. That is, authentication of the electronic control unit 11 and the server device 2 (verification of validity) may be performed using only the MAC key without using the secret key and the public key.

In the above embodiment, although the electronic control unit 11 and the server device 2 are connected via the network 3 to authenticate the electronic control unit 11 and the server device 2, the authentication may be performed by interposing an update device that updates the control program of the electronic control unit 11 of the vehicle 1 and is authenticated by the server device 2 between the electronic control unit 11 and the server device 2. In this case, the update device may add a MAC obtained by encrypting update data with the MAC key to the update data and transmit the data to the electronic control unit 11 authenticated by the server device 2, and the electronic control unit 11 may encrypt or decrypt this data with the MAC key and authenticate the update data. The control program can be updated more safely by authenticating the update data using the MAC key.

The above embodiment can be combined as desired with one or more of the above modifications. The modifications can also be combined with one another.

The present invention can improve security at the time of authentication of an electronic control unit and a server device communicating with the electronic control unit.

Above, while the present invention has been described with reference to the preferred embodiments thereof, it will be understood, by those skilled in the art, that various changes and modifications may be made thereto without departing from the scope of the appended claims.

What is claimed is:

1. An authentication system comprising:
a plurality of an electronic control unit constituting an on-vehicle network mounted on a vehicle; and
a server device configured to communicate with the electronic control unit, wherein
the electronic control unit includes:
a first storage unit configured to store identification information and an encryption key set individually to the electronic control unit and used for generating a code used for authenticating data exchanged between the plurality of the electronic control unit, wherein
the server device includes:
a second storage unit configured to store the identification information and the encryption key of the electronic control unit, wherein
the electronic control unit includes:
a first CPU and a first memory coupled to the first CPU, wherein
the first CPU is configured to perform:
generating authentication data used for authenticating the electronic control unit;
generating an authentication code by encrypting the authentication data generated using the encryption key stored in the first storage unit; and
transmitting the identification information stored in the first storage unit, the authentication data generated, and the authentication code generated to the server device, wherein
the server device includes:
a second CPU and a second memory coupled to the second CPU, wherein
the second CPU is configured to perform:
acquiring the identification information transmitted from the electronic control unit;
retrieving the encryption key of the electronic control unit corresponding to the identification information acquired;
acquiring the authentication data and the authentication code transmitted from the electronic control unit; and
authenticating the electronic control unit using the encryption key retrieved;
wherein the authentication data used for authenticating the electronic control unit is set together with an effective period.

2. The authentication system according to claim 1, wherein
the authentication code is a first authentication code, wherein
the second CPU is configured to perform:
generating a second authentication code by encrypting the authentication data acquired using the encryption key retrieved; and
transmitting the authentication data acquired and the second authentication code generated to the electronic control unit, wherein
the first CPU is configured to perform:
acquiring the authentication data and the second authentication code transmitted from the server device; and
authenticating the server device using the second authentication code acquired and the encryption key stored in the first storage unit.

3. The authentication system according to claim 2, wherein
the second CPU is configured to perform:
authenticating the electronic control unit by decrypting the first authentication code acquired using the encryption key retrieved or encrypting the authentication data acquired using the encryption key retrieved, wherein
the first CPU is configured to perform:
authenticating the server device by decrypting the second authentication code acquired using the encryption key stored in the first storage unit or encrypting the authentication data acquired using the encryption key stored in the first storage unit.

4. The authentication system according to claim 1, wherein
the plurality of the electronic control unit includes a first electronic control unit and a second electronic control unit, wherein
the encryption key set individually to the first electronic control unit and the encryption key set individually to the second electronic control unit are different from each other.

5. The authentication system according to claim 1, wherein
the code used for authenticating data exchanged between the plurality of the electronic control unit is a message authentication code, wherein
the authentication data used for authenticating the electronic control unit is a seed value including a random number.

6. An authentication system, comprising:
a plurality of an electronic control unit constituting an on-vehicle network mounted on a vehicle; and
a server device configured to communicate with the electronic control unit, wherein
the electronic control unit includes:
a first storage unit configured to store identification information and an encryption key set individually to the electronic control unit and used for generating a code used for authenticating data exchanged between the plurality of the electronic control unit, wherein
the server device includes:
a second storage unit configured to store the identification information and the encryption key of the electronic control unit, wherein the electronic control unit includes:
  a first CPU and a first memory coupled to the first CPU, wherein
  the first CPU is configured to function as:
    a data generation section configured to generate authentication data used for authenticating the electronic control unit;
    a code generation section configured to generate an authentication code by encrypting the authentication data generated by the data generation section using the encryption key stored in the first storage unit; and
    an output section configured to transmit the identification information stored in the first storage unit, the authentication data generated by the data generation section, and the authentication code generated by the code generation section to the server device, wherein
the server device includes:
  a second CPU and a second memory coupled to the second CPU, wherein
  the second CPU is configured to function as:
    a retrieval section configured to acquire the identification information transmitted from the electronic control unit to retrieve the encryption key of the electronic control unit corresponding to the identification information acquired; and
    an authentication section configured to acquire the authentication data and the authentication code transmitted from the electronic control unit to authenticate the electronic control unit using the encryption key retrieved by the retrieval sections
    wherein the authentication data used for authenticating the electronic control unit is set together with an effective period.

7. The authentication system according to claim 6, wherein
  the authentication code is a first authentication code, wherein
  the second CPU is configured to function as:
    a code generation section configured to generate a second authentication code by encrypting the authentication data acquired using the encryption key retrieved; and
    an output section configured to transmit the authentication data acquired and the second authentication code generated to the electronic control unit, wherein
  the first CPU is configured to function as:
    an authentication section configured to acquire the authentication data and the second authentication code transmitted from the server device to authenticate the server device using the second authentication code acquired and the encryption key stored in the first storage unit.

8. The authentication system according to claim 7, wherein
  the server device authenticates the electronic control unit by decrypting the first authentication code acquired using the encryption key retrieved or encrypting the authentication data acquired using the encryption key retrieved, wherein
  the electronic control unit authenticates the server device by decrypting the second authentication code acquired using the encryption key stored in the first storage unit or encrypting the authentication data acquired using the encryption key stored in the first storage unit.

9. The authentication system according to claim 6, wherein
  the plurality of the electronic control unit includes a first electronic control unit and a second electronic control unit, wherein
  the encryption key set individually to the first electronic control unit and the encryption key set individually to the second electronic control unit are different from each other.

10. The authentication system according to claim 6, wherein
  the code used for authenticating data exchanged between the plurality of the electronic control unit is a message authentication code, wherein
  the authentication data used for authenticating the electronic control unit is a seed value including a random number.

* * * * *